United States Patent [19]
Spyker et al.

[11] Patent Number: 5,275,740
[45] Date of Patent: Jan. 4, 1994

[54] FILTER PRESS WITH ADAPTIVE AUTOMATED CONTROL ARRANGEMENT

[75] Inventors: David J. Spyker; Victor A. Van't Hof, both of Holland; David P. McLeod, Muskegon, all of Mich.

[73] Assignee: JWI, Inc., Holland, Mich.

[21] Appl. No.: 895,363

[22] Filed: Jun. 8, 1992

[51] Int. Cl.$^5$ .............................................. B01D 37/04
[52] U.S. Cl. .................................. 210/741; 100/45;
  210/143; 210/224; 210/416.1; 364/558; 417/12;
  417/38
[58] Field of Search ................. 210/90, 97, 137, 138,
  210/143, 224, 741, 808, 770; 100/45, 90, 35, 37;
  364/502, 558, 569; 417/12, 18, 19, 38, 46;
  395/166

[56] References Cited

U.S. PATENT DOCUMENTS

| | | | |
|---|---|---|---|
| 3,789,367 | 1/1974 | Dumstorff et al. | 395/166 |
| 4,151,080 | 4/1979 | Zuckerman et al. | 210/741 |
| 4,944,870 | 7/1990 | Yagishita et al. | 210/143 |
| 5,161,954 | 11/1992 | Matheson et al. | 210/741 |
| 5,167,832 | 12/1992 | Carlsson et al. | 210/741 |
| 5,215,007 | 6/1993 | Sebright et al. | 100/45 |

FOREIGN PATENT DOCUMENTS

| | | | |
|---|---|---|---|
| 57-071610 | 5/1982 | Japan | 210/741 |
| 62-014908 | 1/1987 | Japan | 210/224 |

OTHER PUBLICATIONS

JWI "J-Press Liquid/Solids Filtration and Separation Equipment", JWI, Inc., Sep. 1989, (15 pages).
JWI "Automatic Pump Control System", JWI, Inc., Nov. 1983, (11 pages).
JWI "J-Press Liquids—Solids Filtration and Separation Equipment", JWI, Inc., Jun. 1987, (16 pages).
Collection of documents of Gorman-Rupp, Mar. 30, 1992, (40 pages).

*Primary Examiner*—Joseph W. Drodge
*Attorney, Agent, or Firm*—Flynn, Thiel, Boutell & Tanis

[57] ABSTRACT

A method for controlling the filling of a filter press with slurry according to a preferred embodiment of the present invention includes the sequentially executed steps of: gradually increasing the pressure of the slurry supplied to thee press until the slurry pressure reaches an upper pressure limit; recording a trigger point in time at which the slurry pressure reaches the upper pressure limit; and determining whether the slurry pressure subsequently falls below a lower pressure limit within a predetermined period of time commencing at the trigger point. If the slurry pressure does fall below the lower pressure limit within the predetermined period of time, then the above-listed sequence of steps is repeated until the slurry pressure fails to fall below the lower pressure limit within the predetermined period of time, thereby indicating that the press is full and terminating the process.

16 Claims, 8 Drawing Sheets

END SLURRY PRESSURE CONTROL

FILTER PRESS WITH ADAPTIVE AUTOMATED CONTROL ARRANGEMENT

FIELD OF THE INVENTION

This invention relates to an improved method and apparatus for controlling slurry pressure in a filter press in which slurry material is supplied under pressure to a plurality of filter plates by a feed pump and, more particularly, to a method and apparatus in which the slurry pressure is detected by a sensor and adaptively controlled throughout the filtration cycle in a manner which decreases the filtration cycle time while increasing its efficiency.

BACKGROUND OF THE INVENTION

Referring to the general type of filter press mentioned above, if the slurry is initially pumped into the filter press too quickly under too much pressure, this results in the phenomenon known as "blinding" wherein the particulate in the slurry is driven with excessive force into the filter cloth of the filter plates, which disadvantageously clogs the filter cloth. It is therefore desirable to feed the slurry more gradually into the filter press so that the particulate gradually accumulates on the filter cloth to create a particulate bed on the filter cloth. This gradually-accumulated particulate bed filters the remaining slurry upstream thereof.

The aforementioned gradually-accumulated particulate bed is conventionally produced by stepwise increasing the feed pump pressure over time until the slurry pressure eventually reaches a desired end pressure value. However, in order to ensure effective filtering, the magnitude and timing of the stepwise pressure increments are typically determined based on a laboratory analysis of the slurry and the characteristics of the press filter being used. The filter press is typically provided with control devices such as relays, switches and timers which are then configured to produce the desired pressure increments at the desired times.

Thus, the aforementioned stepwise pressure increment approach requires calculation of the magnitude and timing of the pressure increments for each different slurry to be filtered. Moreover, the aforementioned relays, switches and timers introduce undesirable mechanical complexity and require a relatively large amount of space. In addition, the stepwise pressure increment approach requires a preset filtration cycle time (based on the calculated timing parameters) which cannot be adaptively adjusted during the cycle. Further, this approach does not take into account, or adjust for, operational or environmental changes which occur from cycle to cycle.

Hence, although the conventional stepwise pressure increment approach is effective to avoid the "blinding" phenomenon, the benefits of this approach are nevertheless offset to some extent by the disadvantageous factors mentioned above.

One conventional system uses a programmable logic controller (PLC) to control the stepwise pressure increments. This system eliminates some of the difficulties associated with electromechanical control devices, but does not address the other disadvantages mentioned above. A special programming unit is required to program the predetermined cycle parameters into the PLC. Whenever new cycle parameters are required for a new slurry, the programming unit must be temporarily connected to the PLC to program the new cycle parameters into the PLC.

In some conventional systems, a pressure switch is provided in the air supply to the feed pump. Each time the feed pump executes a stepwise pressure increment, the air pressure drops temporarily and causes the pressure switch to activate a timer. However, using this approach, the range of acceptable pressure increments is limited by the sensitivity of the pressure switch. That is, the pressure switch will not trigger the timer unless the pressure increment is sufficient to cause an air pressure drop at least as large as the sensitivity of the pressure switch. Also, the pump pressure is subject to pressure head losses and the like, and consequently the pressure switch can be erroneously actuated.

One known system has attempted to avoid the aforementioned step-wise pressure increment method, and instead has utilized sensors and controls which attempt to regulate the air supply pressure to the pump in response to the slurry pressure leaving the pump so that the pump and slurry pressure are maintained in closer relationship to one another throughout the filter press cycle. This known arrangement, however, is believed to experience operational difficulties caused by the fact that the pump air pressure always attempts to respond to the slurry pressure. In this respect, the Assignee has discovered that in some cycles during filling of the filter press the slurry pressure will suddenly significantly drop prior to again resuming a gradual increase, possibly due to sudden dislodgement of clogs within the press. When these sudden slurry pressure drops occur, it has been observed that if the pump air pressure is allowed to drop due to its responding to the slurry pressure in an attempt to maintain a uniform pressure differential therebetween, then often times can cause a stall condition in the pump and hence seriously disrupt proper operation of the filter press. Further, in this known arrangement, the cycle terminates by activating a timer when a predetermined maximum slurry pressure is reached, which timer permits the press to continue to operate for a preset period of time, such as about two hours, before shutting down the system. This can, in some instances, cause premature shut down of the press prior to complete filling thereof, such as occurs when a premature pressure spike occurs so as to activate the maximum pressure sensor.

Considering the aforementioned approaches to slurry pressure control during the filtration cycle, none of them is capable of adjusting slurry pressure near the end of the cycle, that is, the slurry end pressure. However, Applicants have recognized that adjustment of slurry end pressure facilitates an increase in the filtration cycle efficiency so as to permit shut down of the press only when the press is full.

It is therefore an object of this invention to provide an improved filter press control apparatus, and a method of control, which overcomes many of the advantages associated with prior control methods and apparatus for filter presses.

It is therefore one object of the present invention to provide a slurry press control method and apparatus which can suitably adjust end pressure, and in fact respond to pressure changes after the maximum end pressure has been sensed, to permit continued operation of the filter press and resetting of the end pressure if certain operational conditions are met so as to ensure that the end pressure, when sensed, will permit shut down only when the press is substantially full.

It is another object of the present invention to provide a slurry pressure control method and apparatus, as aforesaid, which is able to sense and respond to, and hence adjust the preset end pressure, such as when the air line pressure decreases, so that the end pressure will still be sufficiently less than the line pressure to permit shut down of the press upon completion of the cycle.

It is a further object of the present invention to provide a slurry pressure control method and apparatus, as aforesaid, which avoids the "blinding" phenomena while also avoiding the disadvantages associated with the prior art approach of stepwise pressure increments.

It is still a further object of the invention to provide a slurry pressure control method and apparatus which is capable of maintaining a substantially uniform pressure differential between the pump and slurry pressures throughout the filling cycle to optimize the filling of the press, with the control method and apparatus being such as to maintain the pump pressure constant when the slurry pressure decreases during the cycle so as to prevent control problems such as pump stall.

It is another object of the present invention to provide a slurry pressure control method and apparatus, as aforesaid, which enables the filter press cycle to automatically proceed substantially unattended between press start up and shut down so that a complete cycle can be carried out without requiring substantial or constant operator control and/or observation.

It is still another object of the invention to provide an improved slurry control method and apparatus, as aforesaid, wherein the press has a visual display and controller provided directly thereon which permits easy inputting of various cycle parameters such as initial start pump pressure, slurry cycle end pressure and the like, and which provides during the operating cycle a visual display of all critical and desirable operating conditions, with the visual display permitting the various conditions to be sequentially visually displayed on the control panel, with such display being automatically or manually scrolled to provide the operator with important information as to the current status of the cycle without requiring continuous monitoring or attendance by the operator.

A method for controlling the filling of a filter press with slurry according to a preferred embodiment of the present invention includes the sequentially executed steps of: gradually increasing the pressure of the slurry supplied to thee press until the slurry pressure reaches an upper pressure limit; recording a trigger point in time at which the slurry pressure reaches the upper pressure limit; and determining whether the slurry pressure subsequently falls below a lower pressure limit within a predetermined period of time commencing at the trigger point. If the slurry pressure does fall below the lower pressure limit within the predetermined period of time, then the above-listed sequence of steps is repeated until the slurry pressure fails to fall below the lower pressure limit within the predetermined period of time, thereby indicating that the press is full and terminating the process.

The aforementioned method is preferably carried out by providing the press of the invention with a control panel thereon which contains suitable control means, such as a suitable microprocessor, capable of responding to a signal which is indicative of the slurry pressure leaving the pump so as to adjust the air pressure supplied to the pump to maintain a substantially constant differential therebetween, except for the air pump pressure being maintained substantially constant when the slurry pressure decreases, with the pump pressure remaining constant until the slurry pressure again builds up so as to permit resumption of the predetermined differential between the pressures. The controller also preferably includes a visual display panel directly on the press for permitting operator-setting of cycle parameters, and for also permitting display of actual cycle parameters and conditions throughout the rather lengthy press filling cycle so as to permit the operator to readily and promptly obtain necessary information without requiring constant attendance or supervision by the operator.

Other objects and purposes of the invention will be apparent to persons familiar with systems of this general type upon reading the following specification and inspecting the accompanying drawings.

BRIEF DESCRIPTION OF THE DRAWINGS

An exemplary embodiment of the invention is described in detail below with reference to the drawings, in which.

Figure 1:
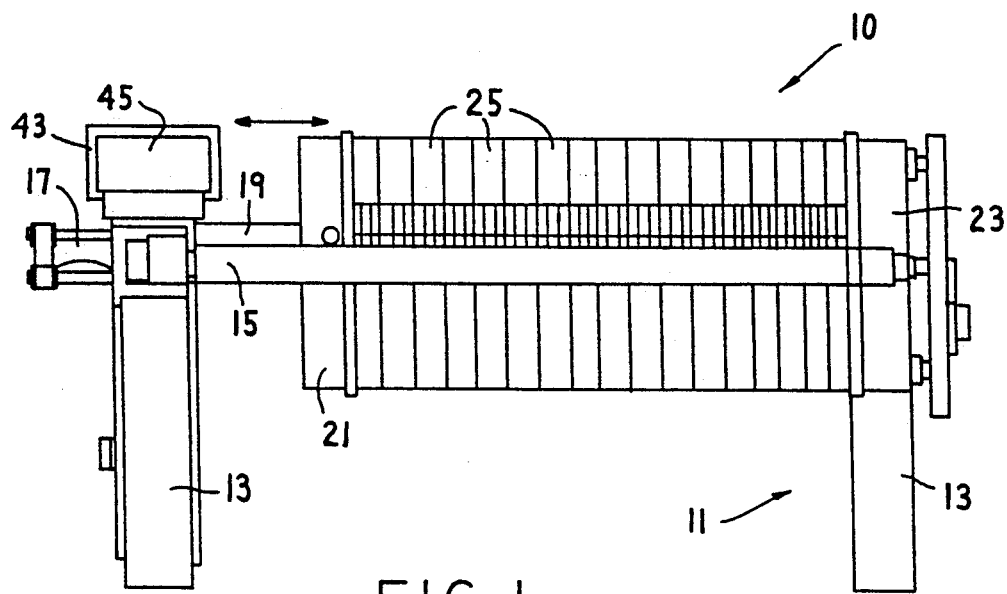
FIG. 1 is a side elevational view of a filter press which embodies the present invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the press and designated parts thereof. Said terminology will include the words specifically mentioned, derivatives thereof, and words of similar import.

DETAILED DESCRIPTION

Figure 2:
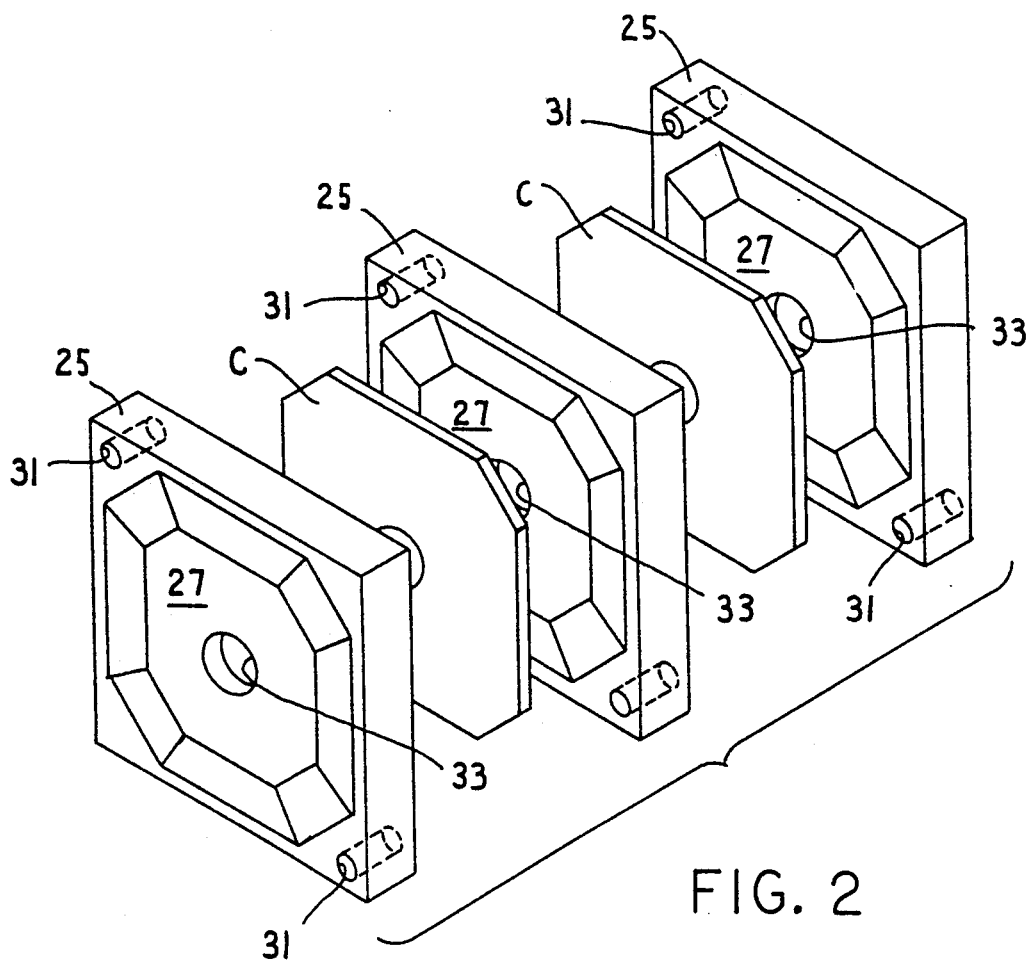
FIG. 2 is an exploded view of a portion of the filter press of FIG. 1.
Figure 3:
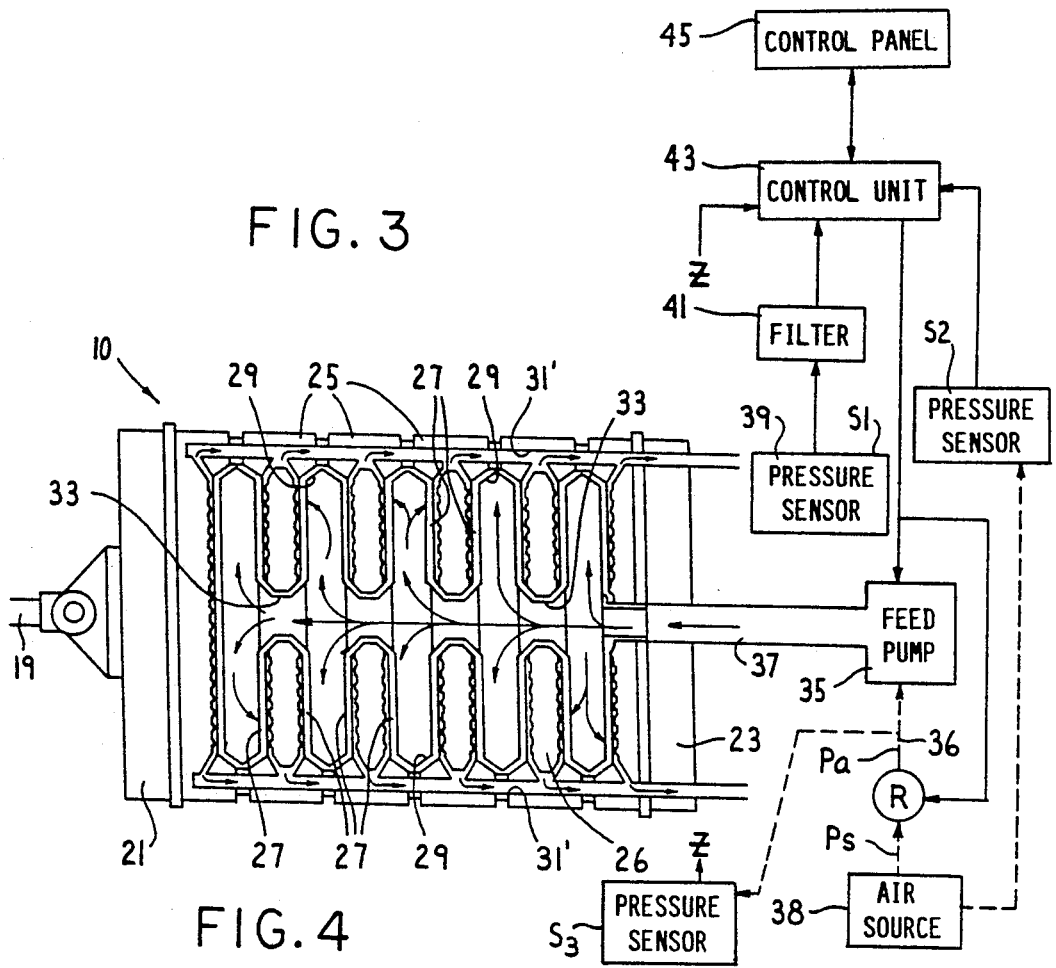
FIG. 3 is a diagrammatic view which illustrates the manner in which the present invention filters slurry material and controls slurry pressure.

FIGS. 1-3 illustrate a filter press 10 embodying the present invention. The filter press 10 includes a frame 11 having a pair of upright supports 13 and a pair of generally parallel, horizontal slide rails 15 supported on the supports 13 and extending generally horizontally therebetween.

A movable head or follower 21 is supported for sliding movement longitudinally along the slide rails 15. A fluid pressure cylinder 17 is mounted on one of the supports 13. A cylinder rod 19 is extendable from and retractable into the pressure cylinder 17. The cylinder rod 19 extends generally parallel to the slide rails 15 and has one end connected to the movable head 21, whereby the pressure cylinder 17 effects reciprocal sliding movement of the movable head 21 along the slide rails 15.

A stationary head 23 is fixedly mounted on the other support 13, and a plurality of filter plates 25 are interposed between the movable head 21 and the stationary head 23. The filter plates 25 are supported on the slide rails 15 and are freely reciprocally slidable thereon between the upright supports 13.

Each of the filter plates 25 has a pair of parallel enlarged faces, each of which is provided with a filter cloth 27. The filter cloths 27 lie in substantially vertical planes which are perpendicular to the slide rails 15. A central opening 33 extends completely through each of the filter plates 25 at the center of the filter cloths 27.

When the pressure cylinder 17 is actuated so as to slide the movable head 21 rightwardly in FIG. 1, the filter plates 25 are pressed together between the heads 21 and 23 in snugly adjacent, sealed relationship relative to one another. The sealed relationship between adjacent filter plates 25 may be effected by, for example, a suitable O-ring or gasket as is well known in the art.

Each filter plate 25 is a generally hollow, rectangular body having an interior space or chamber 26 defined there-inside and separated from the exterior thereof by the filter cloths 27. The filter plates 25 are provided with return passages 31 which communicate with the interiors 26 of the filter plates 25 for permitting clear filtrate to be returned from the filter plates. As shown in FIG. 3, when the filter plates 25 are disposed in adjacent sealed relationship, the return passages 31 define return conduits 31' which carry clear filtrate out of the filter press 10.

Pressurized slurry material is supplied to the filter press 10 from a feed pump 35 via a supply inlet 37. The feed pump 35 is conventionally a double-diaphragm air-activated pump connected by an air line 36 to a source of pressurized air 38, such as a central pressurized air supply within a building. The slurry supply inlet 37 communicates through the head 23 with the aligned central openings 33 of the filter plates 25. Slurry chambers 29 are defined between opposing filter cloths 27 of adjacent filter plates 25. The slurry material passes from the supply inlet 37 through the aligned central openings 33 and into the slurry chambers 29 as illustrated by the arrows in FIG. 3. When the slurry is sufficiently pressurized, particulate accumulates on the filter cloths 27 while clear filtrate passes through the filter cloths 27 into the interiors 26 of the respective filter plates 25 and ultimately into the return conduits 31'. The particulate accumulates in the slurry chambers 29, forming filter cakes C as shown in FIG. 2. The filter plates 25 are thereafter slidably separated, and the filter cakes C are removed.

The description of the structure and operation of the filter press as described above is well known, and further detailed description of the press is believed unnecessary. The following description will hence be directed to the control apparatus and method associated with the filter press for optimizing start up and filling of the press with filtrate throughout a cycle, optimizing shut down of the press when filled so as to complete the cycle, and controlling of the press in response to changing external or internal operating conditions and parameters so as to optimize the filling efficiency of the cycle.

A pressure sensor 39 is provided to monitor the slurry pressure supplied to the press. In the disclosed embodiment, the pressure sensor is disposed at the supply inlet 37 between the feed pump 35 and the filter press 10, normally adjacent the pump discharge. Because the pressure sensor 37 interacts with the slurry material, it is necessary to use a sensor which will not be clogged by the slurry material. A conventional diaphragm sensor accurately detects the slurry pressure without being clogged by the slurry material.

The feed pump 35, as noted above, is preferably an air-activated diaphragm type pump. The slurry pressure is characterized by a sequence of pressure pulses. These pressure pulses are detected by the sensor 37, and the output of the sensor 37 is filtered by a smoothing filter 41 which eliminates short spikes associated with the pulsing slurry pressure. Thus, the output of filter 41 essentially represents an average value of the pulsing slurry pressure. This average slurry pressure is provided to a control unit 43 which controls the feed pump 35 in response to the slurry pressure. More specifically, the control unit 43 controls the pressure regulator R so that the pressure supplied through line 36 from the air source 38, the latter being typically a rather high and fairly uniform pressure, is reduced so that the actual air pressure supplied to the pump 35 (i.e. the pump pressure) is only a small amount greater than the actual slurry pressure, as explained in detail below. The control unit 43 preferably includes a conventional microprocessor circuit, as will be evident from the following description.

Figure 4:
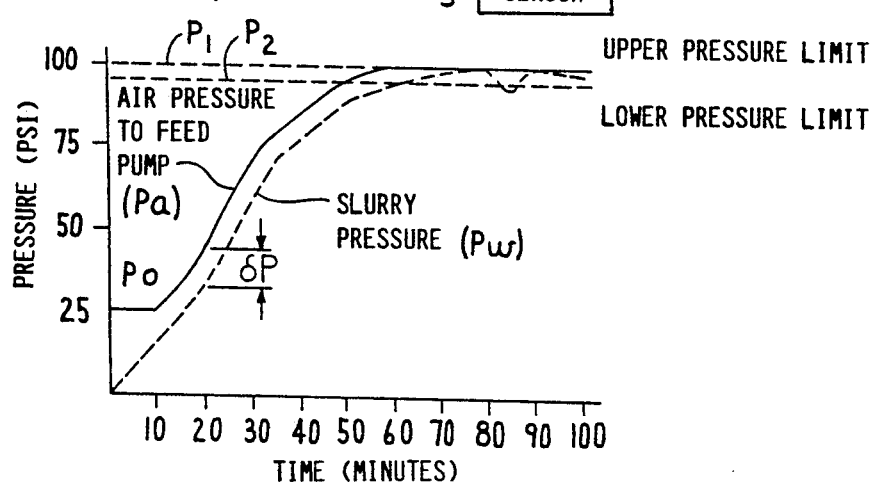
FIG. 4 is a graph which illustrates pump pressure and slurry pressure during a filtration (i.e. press filling) cycle according to the present invention.

FIG. 4 illustrates pump pressure and slurry pressure during a filtration (i.e. press filling) cycle according to the method of the present invention. The air pressure $P_a$ to the feed pump 35 (shown by solid line in FIG. 4) is set to an initial value $P_0$ (about 25 PSI in a typical cycle) and, when the slurry pressure $P_w$ (shown by broken line in FIG. 4) rises to within a predetermined range of the air pressure, the air pressure $P_a$ is then increased so as to normally continuously maintain a predetermined pressure difference $\delta P$ between the pump pressure and the slurry pressure $P_w$. This difference $\delta P$ between pump pressure and slurry pressure is referred to as lead pressure, and the lead pressure is preferably approximately 5 PSI in the disclosed embodiment.

When the air pressure $P_a$ to the feed pump reaches an upper pressure limit $P_1$, it is maintained at that upper pressure limit. Thereafter, the slurry pressure $P_w$ eventually reaches the upper pressure limit $P_1$. After the slurry pressure initially reaches the upper pressure limit, it will often subsequently drop substantially to a pressure level below a lower pressure limit $P_2$, the latter typically being about 10 PSI less than $P_1$. This may indicate that the press is not yet filled, and hence the utility of the filtration cycle is not necessarily exhausted just because the slurry pressure has reached the upper pressure limit $P_1$.

Figure 5:
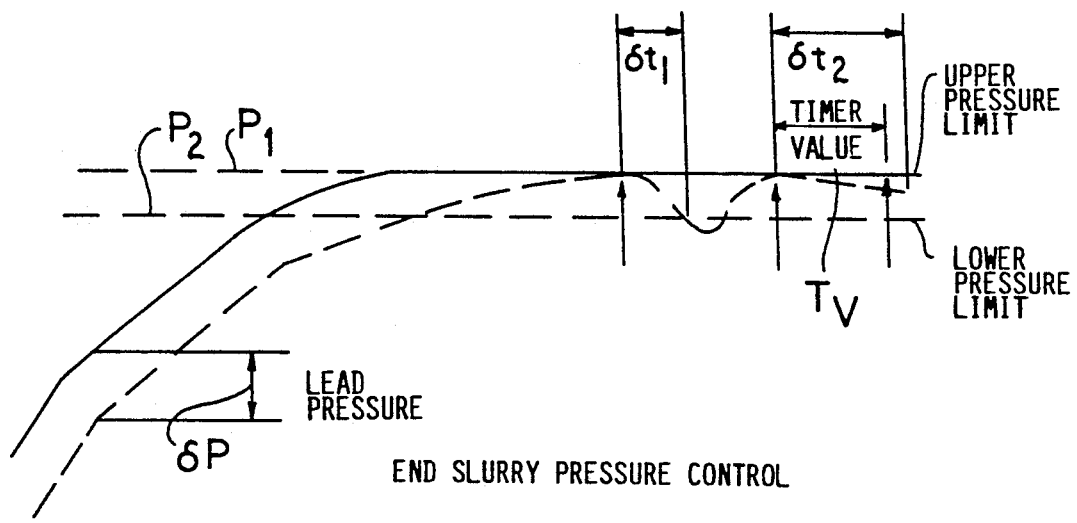
FIG. 5 is an enlargement of a portion of FIG. 4.

Referring to FIG. 5, when the slurry pressure initially reaches the upper pressure limit $P_1$, a timer in the control unit 43, which timer has a preset timer value $T_v$ programmed therein, is initialized and started. The filtration cycle is not considered finished unless and until the slurry pressure remains above the lower pressure limit $P_2$ for the entire duration of the timer. Thus, if the slurry pressure falls below the lower pressure limit $P_2$ before the timer times out or expires ($\delta t_1 <$ TIMER VALUE), then the timer is deactivated and is reset and restarted only when the slurry pressure again reaches the upper pressure limit $P_1$. This procedure is continued until the slurry pressure fails to fall below the lower pressure limit $P_2$ before the timer value $T_v$ expires. When the slurry pressure fails to fall below the lower pressure limit before the timer expires ($\delta t_2 \geq$ TIMER VALUE), then the press is full, the filtration cycle is over, the feed pump is shut down, and the filter plates are thereafter sequentially separated to dump the filter cakes.

Figure 4A:
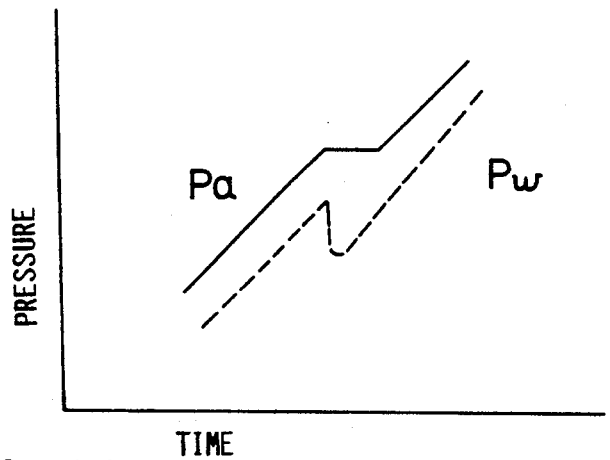
FIG. 4A corresponds to the graph of FIG. 4 but illustrates the control of the pump pressure during the filling cycle when the slurry pressure decreases.

Referring now to FIG. 4A, wherein there is again illustrated the relationship between the pump and slurry pressures during the press filling cycle, it sometimes occurs that the slurry pressure $P_w$ may undergo a substantial decrease over a significant time period during the filling cycle. While the reason for such decrease in slurry pressure is not always known, nevertheless sometimes partial clogs of filtrate within the press become dislodged and repositioned to reduce resistance to further supply of slurry and hence cause such pressure decreases. When such decrease occurs, the pump air pressure $P_a$ according to the present invention is maintained constant by the control unit 43, rather than being decreased so as to maintain the differential $\delta P$ constant. By maintaining the pump air pressure $P_a$ constant during the slurry pressure decrease, proper control of the system is maintained and pump stall is prevented. Thereafter the slurry pressure $P_w$ will again build up to the point whereby the desired differential $\delta P$ again exists between the pump and slurry pressures, at which time further increases in slurry pressure will again be sensed by the sensor and signals sent to the controller 43 so as to again permit the pump air pressure to be increased to maintain the desired pressure different $\delta P$ therebetween.

In a typical embodiment, the upper pressure limit $P_1$ is approximately 100 PSI, the lower pressure limit $P_2$ is approximately 95 PSI, and the timer value is approximately 10 minutes (TIMER VALUE = 10 minutes). Since the building line air pressure at 38 is typically between about 100 and 120 PSI, the upper limit $P_1$ is hence selected to be somewhat less than line air pressure. However, parameters such as upper limit pressure $P_1$, initial pump pressure $P_0$ and timer value $T_v$, can be easily changed and programmed into the control unit 43 via the control panel 45 provided on the press, as explained below. Hence, the pertinent operating parameters are easily changed using the control panel 45.

Figure 6:
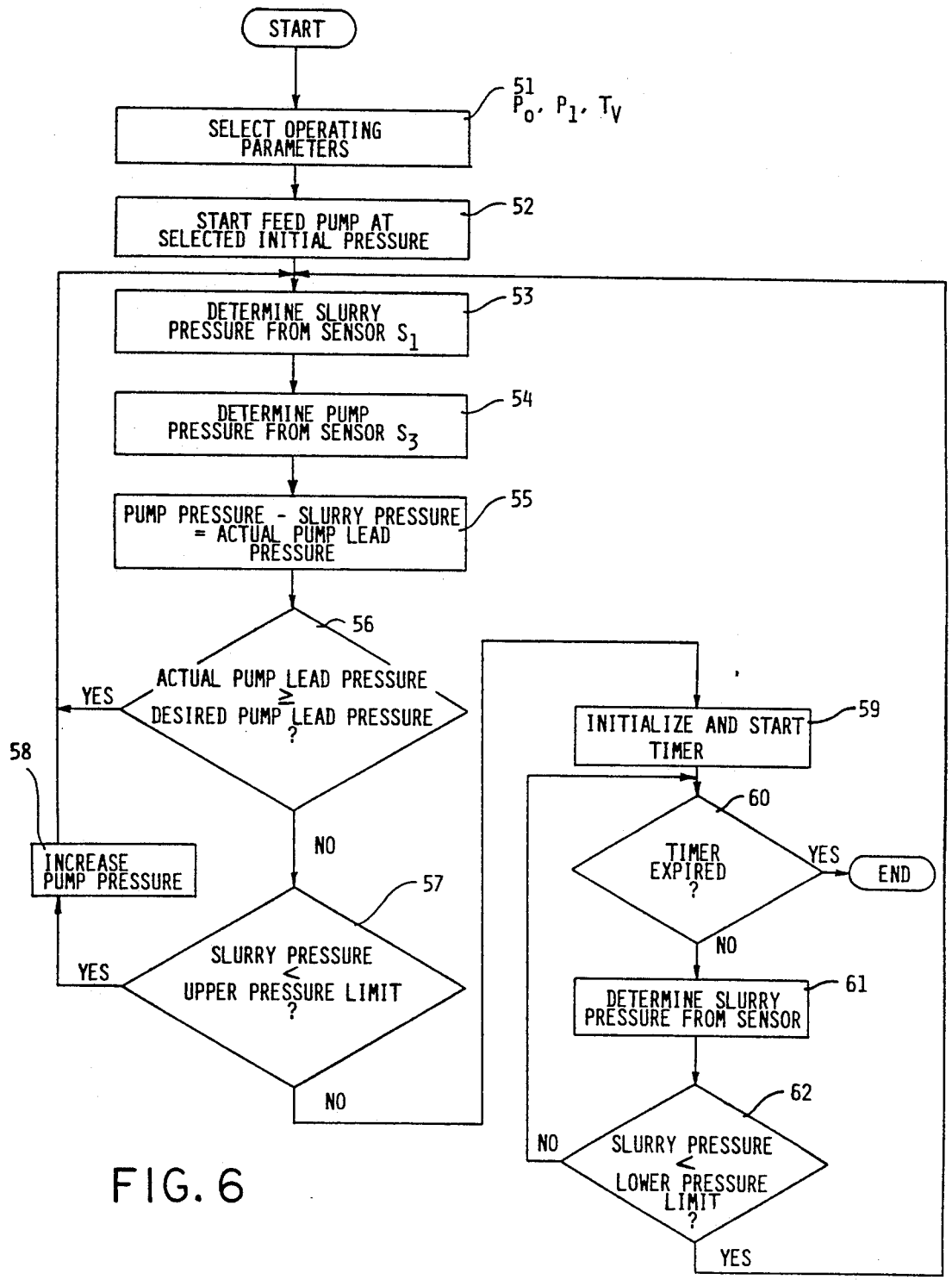
FIG. 6 is a flow chart illustrating the process by which the present invention controls slurry pressure during filling of the press.

FIG. 6 is a flowchart illustrating the method of controlling slurry pressure $P_w$ according to the present invention to achieve the operation illustrated in FIGS. 4 and 5. Initially, the desired operating parameters such as the upper pressure limit $P_1$, initial pump pressure $P_0$ and timer value $T_v$ are selected at 51, as explained in detail hereinafter. The lower pressure limit $P_2$ (as a function of $P_1$) and the pressure differential $\delta P$ are typically preprogrammed, but could also be selected if desired. Thereafter, at 52, the feed pump is started at the selected initial pressure $P_0$.

After starting the feed pump at 52, the sequence of steps at 53-58 is repeatedly executed until the pump pressure reaches the upper pressure limit $P_1$. More specifically, the pressure sensor 37 is used to determine slurry pressure at 53, and the actual pump lead pressure $\delta P$ is determined at 54 by the detected slurry pressure from the pump pressure. At 56, if the actual pump lead pressure is greater than or equal to the desired pump lead pressure $\delta P$, then the pump pressure temporarily remains constant and execution returns to 53. Otherwise, if the actual pump lead pressure $\delta P$ is less than the desired pump lead pressure programmed into the control unit 43, then execution proceeds to 57 where the slurry pressure $P_w$ is compared to the upper pressure limit $P_1$.

At 57, if the slurry pressure is less than the upper pressure limit $P_1$, then the pump pressure is increased at 58 by the control unit 43 controlling the pressure regulator R, and thereafter execution returns to 53. If the slurry pressure has reached the upper pressure limit $P_1$ at 57, then execution of the sequence of steps 53-58 ends, and another sequence of steps 59-62 begins.

When the slurry pressure $P_w$ reaches the upper pressure limit $P_1$ at 57, the timer of control unit 43 is initialized and started at 59. After the timer is started at 59, then the slurry pressure is continuously updated and compared to the lower pressure limit $P_2$ until either the slurry pressure reaches the lower pressure limit at 62 or the timer expires at 60. If the slurry pressure reaches the lower pressure limit at 62 before the timer expires at 60, then the sequence 53-62 begins again. On the other hand, if the timer expires at 60 before the slurry pressure reaches the lower pressure limit at 62, then the filtration cycle is completed and the pump is shut down.

It should be evident from FIG. 6 that, once the operating parameters are selected at 51 and the feed pump is started at 52, the remainder of the control method is executed automatically by the arrangement illustrated in FIG. 3. Furthermore, the operation illustrated in FIGS. 4 and 5 reflects the current operating conditions in the filter press and therefore permits adaptive control and efficient use of the filtration cycle time. More specifically, the filtration cycle time reflects the actual conditions in the filter press and is not fixed at a preset time value as is required when predetermined stepwise incremental pressure increases are used. Thus, whenever conditions in the filter press are such as to permit decreasing the filtration cycle time, then the method of the present invention will automatically decrease the filtration cycle time. In addition, the present invention's treatment of the end slurry pressure permits an increase in the filtration cycle efficiency because the current filtration cycle does not end until the filter press capacity and hence its utility has been sufficiently exhausted.

Since the source or line pressure $P_s$ in the centralized building supply has been observed to undergo significant fluctuations which cause it to be substantially less than the typical expected value, such as during cycles when a facility is under heavy use, it has been observed that the line pressure $P_s$, instead of typically being at or in excess of 100 PSI, may drop significantly below 100 PSI, and in fact may drop below the predetermined upper pressure limit $P_1$. In such instance, since the maximum pump air pressure will always be equal to and more typically slightly below maximum line pressure $P_s$ due to head losses and the like, the press would be unable to develop a slurry pressure equal to the upper pressure limit $P_1$, and the cycle would not terminate and shut down the press. The microprocessor control of the present invention preferably incorporates therein additional controlling limitations which are depicted by the control steps of FIG. 7.

Figure 7:
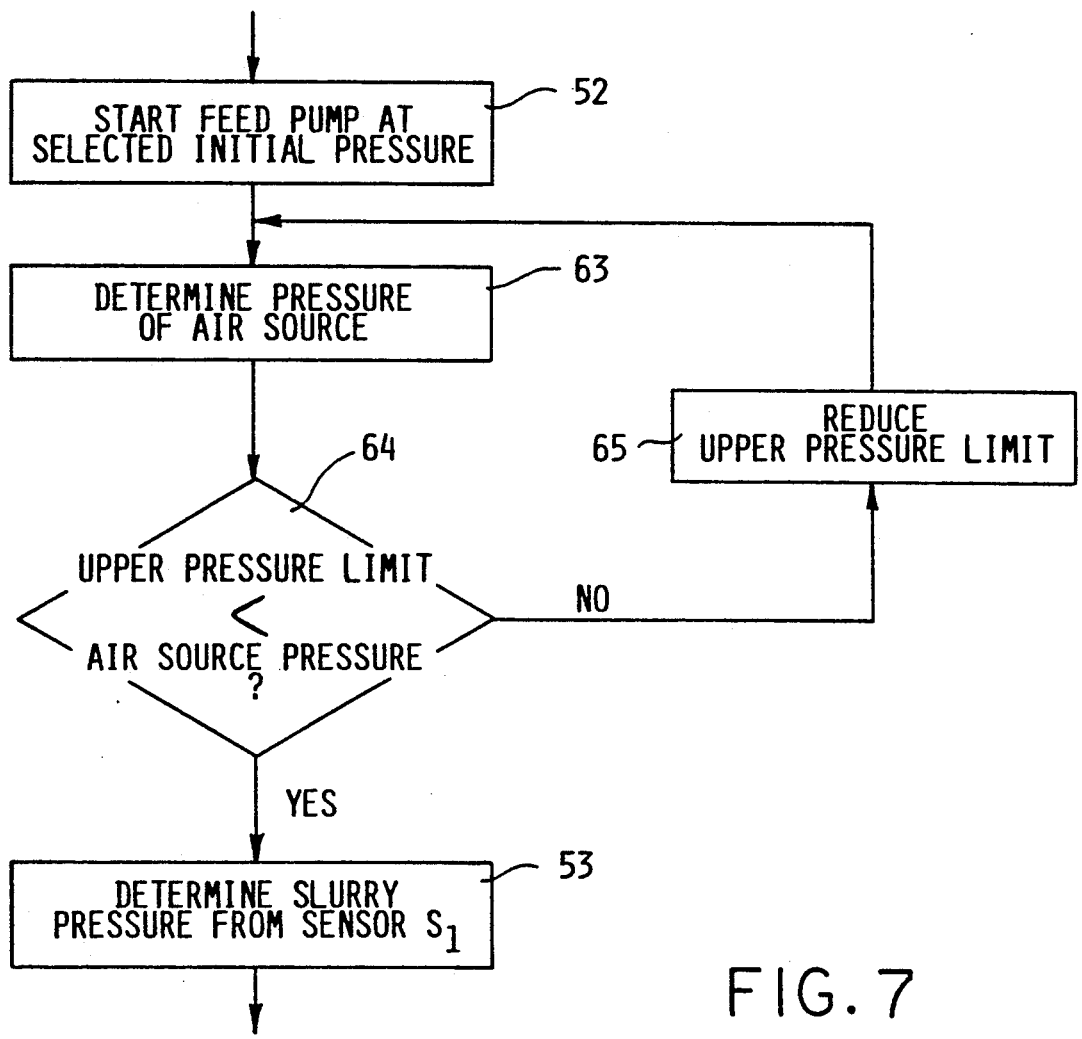
FIG. 7 illustrates a variation for incorporation into the control process of the present invention, which variation is illustrated for incorporation into the flow chart of FIG. 6.

As indicated by FIG. 7, the control preferably includes the additional steps of determining the pressure $P_s$ of the air source at 63, such being through a further pressure detector S2 for feeding a pressure signal to the control unit 43. The preprogrammed or preset upper pressure limit $P_1$ is then compared to the detected actual pressure of the air source at 64 and, if the air source pressure is greater than the upper pressure limit $P_1$, then the control sequences to the next step 53.

However, if the upper pressure limit $P_1$ at step 64 is not less than the air source pressure $P_s$ by at least a minimal predetermined pressure differential, such as about 5 PSI, then the control will reduce the value of the upper pressure limit $P_1$ at 65 to a value which will be a small predetermined differential below the air source pressure $P_s$ and then returned to step 63 to again permit repeating of steps 63 and 64 and thence onto step 63 when applicable. In this fashion, the upper pressure limit $P_1$ will be continuously adjusted and reduced throughout the filtration cycle, if necessary, to ensure that it is sufficiently less than the source pressure $P_s$ to permit termination of the cycle and shut down of the press.

Figure 8:
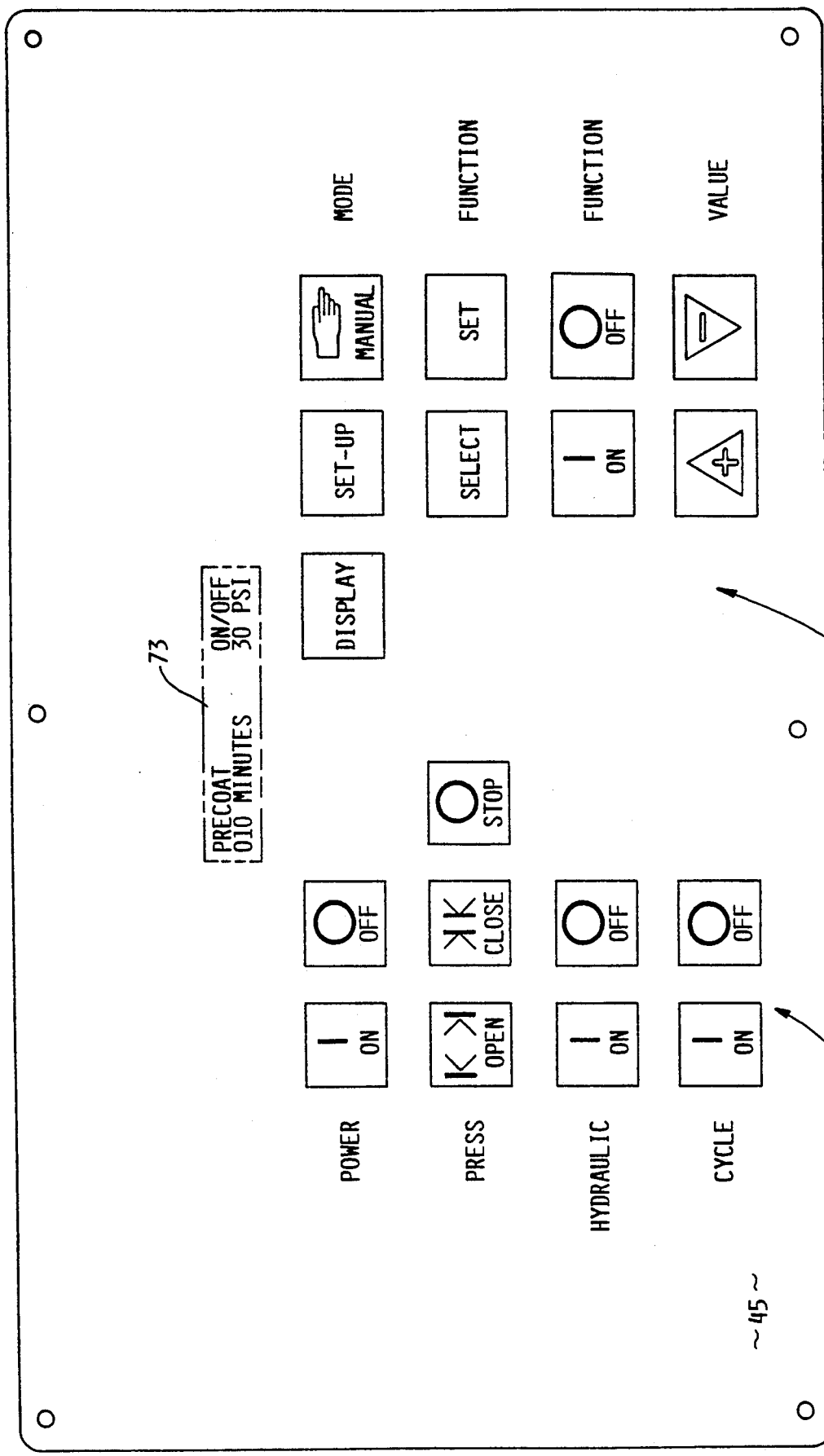
FIG. 8 illustrates the control panel and visual display as associated with the filter press.

Referring now to FIG. 8, there is illustrated the control panel 45 which, in the preferred embodiment of the invention, is mounted directly on the filter press for providing control of the press, including the inputting of operating parameters into the microprocessor control, and the observing of control and operational conditions. This panel 45 includes a first keypad 71, preferably a membrane-type keypad, for enabling the operator to readily input operating parameters, control the operation of the press, and observe the operating conditions and parameters during an automated operating cycle. For this purpose, the keypad 75 includes three MODE keys, namely "display", "set-up" and "manual" keys; four FUNCTION keys, namely "select", "set", "on" and "off" keys; two VALUE keys, namely "plus" and "minus" keys; which keys permit inputting of operating parameters and selection of the various operating modes and functions. The second keypad 72, also of the membrane type, includes "on" and "off" POWER keys; "open", "closed" and "stop" PRESS keys for respectively controlling the opening and closing movement of the press or stopping such movement; "on" and "off" HYDRAULIC keys for controlling the hydraulic system which pressurizes the press in the closed condition; and "on" and "off" CYCLE keys which control the operational cycle of the press. The keys defining the keypad 72 are primarily for operation of the press, namely the initiation and control of an operational cycle.

Control panel 45 also contains thereon a visual display 73, preferably a LED display, which provides the operator with warnings, programming instructions, set-up and operating instructions, and operating conditions which can be either manually or automatically scrolled across the visual display, as explained below.

Figure 9:
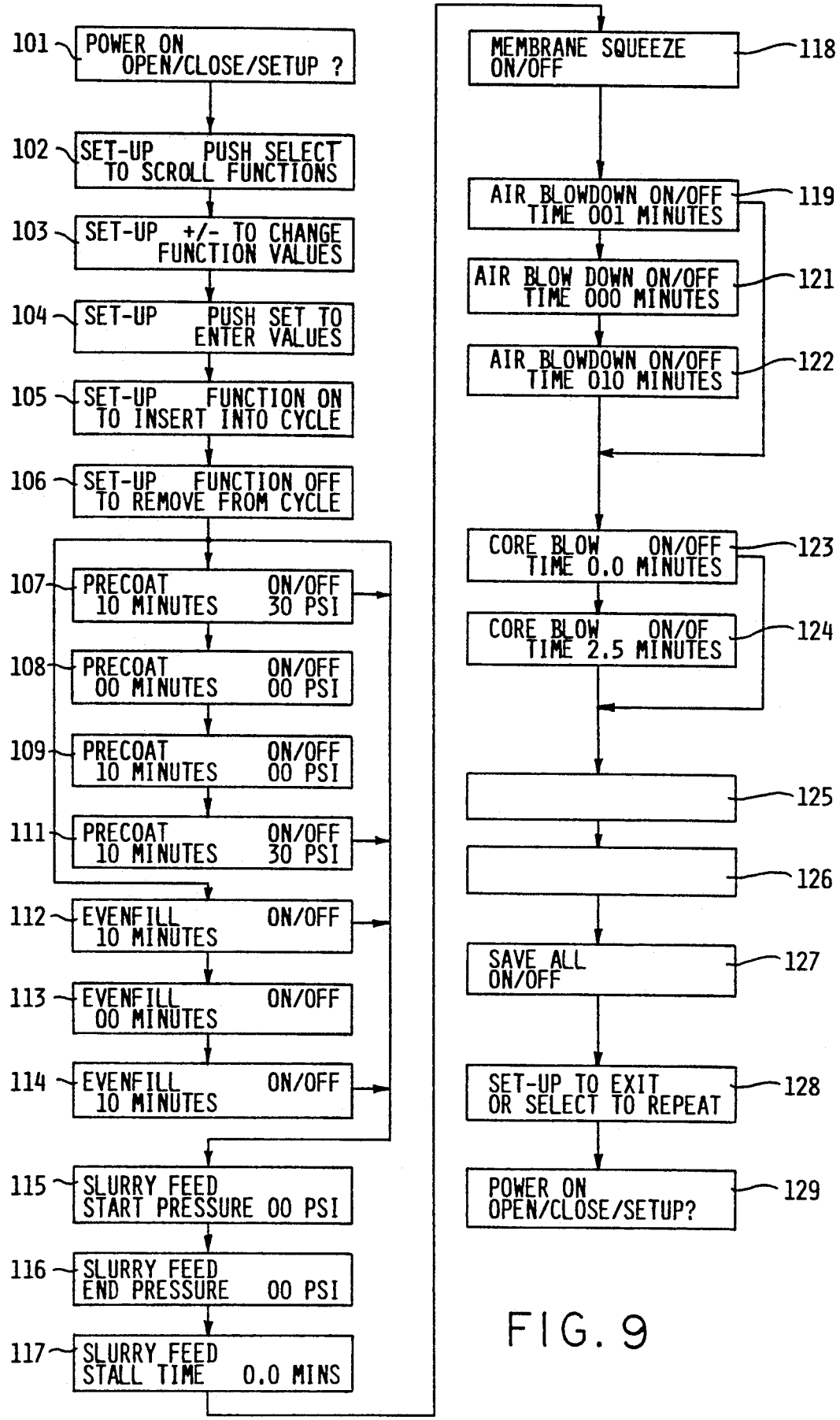
FIG. 9 is a flow chart illustrating, in steplike sequence, the visual displays and prompts which appear on the display panel when setting (i.e., programming) the operational parameters of the press cycle.

Referring now to FIG. 9, there is presented a flow chart which illustrates the visual displays which, in a typical embodiment, will sequentially appear in the display 73 of the control panel 45 (FIG. 8) during initial programming of the microprocessor control by the press operator. These are briefly summarized as follows:

Steps 101-106

The operator pushes the POWER "ON" key and the display 101 appears in window 73. To program the operating parameters of the press, the operator pushes the MODE "SET-UP" key, and the displays 102-106 will sequentially appear in the window 73. To review the functions preprogrammed into the control, including selecting the desired functions and changing or inputting control parameters, the operator will then press the FUNCTION "SELECT" key. The first function or option preprogrammed into the controller by the factory will now be displayed in window 73.

Steps 107-111

Precoat is a process used to precoat the filter press cloths with a release agent to improve filter cake release and filtrate quality. The precoat option, when provided in the controller, fills the filter press uniformly by closing the lower discharge manifold ports of the press for a period of time. After the filter press fills with liquid, the lower ports are reopened resulting in a more uniform press loading. Precoating is a known operating condition in filter presses. If the press is provided with this precoat option, then after the operator presses the "SELECT" key in step 102 above, then the display 107 will appear in window 73. If precoat is not desired, the operator can press the FUNCTION "OFF" key, followed by pressing the FUNCTION "SET" key, in which case the control automatically skips down to step 115.

However, if precoat is desired, and the operator presses the FUNCTION "ON" key, this causes the display 108 to appear and then the operator can press the VALUE "plus" or "minus" keys to set the desired precoat time, which time will appear in the display, with the selected time being locked in by the operator pushing the FUNCTION "SET" key. Next the operator sets the air supply pressure to the precoat pump using the VALUE plus or minus keys, and then locks in the pressure by pushing the FUNCTION "SET" key. The precoat setting is now complete and the next option programmed into the control will be automatically displayed in window 73. If there are no other options, then the display 115 will appear.

Steps 112-114

Evenfill is a process for filling the filter press uniformly by closing the lower discharge manifold ports for a period of time. After the filter press fills with liquid, the lower ports are reopened resulting in a more uniform press loading. Evenfill is an option which can be provided on the press, although a press can be provided with either precoat or evenfill, but not both. If the press is provided with evenfill, then when the operator pushes the "SELECT" key at step 102, then the display 112 will automatically appear. To skip evenfill, the operator sequentially pushes the FUNCTION "OFF" and FUNCTION "SET" keys, and then the program automatically skips to the next option or display, such as display 115. However, if evenfill is desired, then the operator pushes the FUNCTION "ON" key causing the display 113 to appear, and then the operator pushes the VALUE plus or minus keys to set the desired time, and then locks in this time as appearing in display 114 by pushing the FUNCTION "SET" key. The evenfill setting is now complete, and the control will now automatically display in the window 73 the next option which is preprogrammed into the control, such as the display 115.

Alternately, if the press is not provided with either precoat or evenfill, then depression of the SELECT key is step 102 can automatically result in the display 115 appearing in the window.

Steps 115–117

The slurry feed start pressure of display 115 is the initial air pressure supplied to the feed pump for feeding slurry to the press, namely the pressure $P_0$. The operator sets the desired start pressure by depressing the VALUE plus or minus keys until the display reads the desired pressure, and then the operator locks in the pressure by depressing the FUNCTION "SET" key. The display 116 then automatically appears, which "end pressure" is the high pressure limit $P_1$. Again, the operator depresses the VALUE plus or minus keys to set the maximum slurry end pressure $P_1$ as appearing in the display 116, and then locks in this value by depressing the FUNCTION "SET" key. Display 117 thereafter appears, with "stall time" being the time value $T_v$. The operator again sets the time by use of the VALUE keys, which time is normally set so as to correspond to or be slightly less than the length of time between pump strokes when the press is filled, which time value will appear in the display 117. This selected time value is then locked in by the operator depressing the FUNCTION "SET" key. The next option preprogrammed into the control will now be displayed in the window 73, which next option will typically be the display 118.

Steps 118–124

After filtration, when the filter press chambers are filled with cake and the press is still closed, air or water pressure can be exerted behind the diaphragms of the filter press plates. This pressure causes the diaphragms to flex outwardly to squeeze out additional liquid found in the filter cakes. This is known as "membrane squeeze". The display 118 allows the operator to either turn on or turn off the membrane squeeze function by depressing either the FUNCTION "OFF" or "ON" keys, followed by depression of "SET" key. If turned "ON", then the membrane squeeze operation will automatically take place during the cycle following filling of the press.

After filtration, when the filter press chambers are filled with cake and the press is still closed, liquid still remains behind the filter plate cloths and in the four-corner discharge plumbing of the press. An air blow down manifold on the filter press allows air to be blown through the plumbing for a period of time to remove the liquids found in the filter plates and discharge plumbing. The operator at display 119 can select to either turn on or off the air blow down and, if turned on, can select at display 121 the period of time for blow down. If the blow down is turned "OFF", then the display automatically indexes to the next display 123, whereas if it is turned "ON", then it indexes first to the display 121 so that the operator can set the desired blow down time as shown at display 122.

Core blow is a process of blowing air through the filter plates to push unfiltered slurry out of the filter plates feed section from the tail plate forward to the head plate and the inlet feed pipe. Again, if at display 123 the operator turns off the "core blow", then the next display, such as whatever option follows next, such as a display 125, will appear. If the operator turns on the core blow, then the operator sets the length of time as indicated at display 124 and locks in the time, whereupon the next display will automatically be indexed into the window.

Other options provided by the press program control, such as options for controlling an automatic plate shifter, controlling bombay doors for dumping the press, or the like, can also be provided. Such additional functions vary from press to press, and are only diagrammatically illustrated by the displays 125 and 126.

Step 127

After all of the options have been selectively displayed in the window 73 and the operator has made the desired choices, then the display 127 will automatically appear in the window 73. To store into memory all of the selections that the operator has previously made, as described above, the operator then sequentially depresses the FUNCTION "ON" and "SET" keys. If the operator pushes the "OFF" key, then he can go back and review the selections, prior to storing them in memory.

Step 128

After performing either of the selections commanded by display 127 above, then the display 128 automatically appears. If the operator depresses the "SELECT" key, then the control automatically returns to the first display that the operator previously programmed, for example display 107. At that time the operator may change the selections as previously programmed, and each time the operator pushes the "SET" key, it will automatically display in window 73 the next screen previously programmed. When the operator has completed his review of all prior selections and made any necessary revisions, then all selections are stored in memory by depressing the "ON" and "SET" keys when reaching display 127. Thereafter, at display 128, the operator then can push the MODE "SET-UP" key to exit from the set-up programming mode of the control. This will now cause the display 129 to automatically appear in the window 73.

The set-up programming is now complete and the control is ready for the operator to initiate a cycle of press operation.

Figure 10:
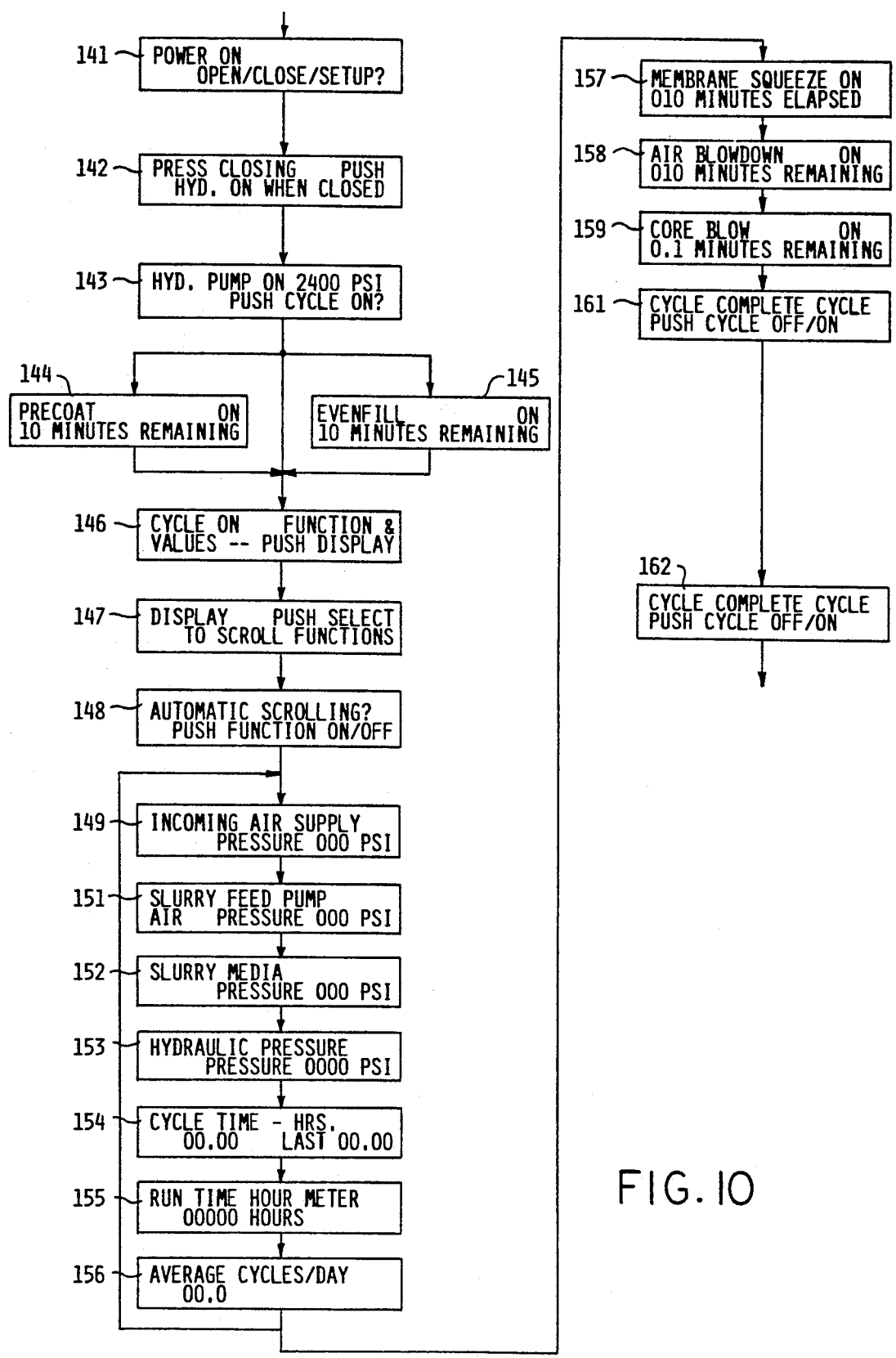
FIG. 10 is a flow chart similar to FIG. 9 which illustrates some of the displays which are sequentially provided on the display panel of the press to initiate and during the cycle of filter press operation.

The operation of the filter press according to the present invention will now be described with reference to FIG. 10 wherein some of the displays and specifically the operational instructions which appear in the window 73 are illustrated in step-wise sequence. These are described as follows:

Step 141

The POWER "ON" display appears when the machine is initially turned on by the operator, or after completion of the programming as described above, which programming can be inserted just prior to operation of a cycle, or could have been inserted prior to a previously cycle since such programming will be maintained until changed. If the operator presses "CLOSE" to initiate a cycle, then the display 142 appears and the press is closed. After the press is fully closed, then the display 143 appears, and the operator will press the "ON" key to activate the hydraulic system which clamps the press closed.

Steps 144–145

Pursuant to the prompt of display 143, either display 144 or 145 will appear if the press is equipped with either precoat or evenfill. These operations will automatically be initiated and will time out, which timing out will appear on the display. Thereafter the display 146 will automatically appear.

Step 146

When this display appears, the operator can View the process control cycle by pushing the MODE "DISPLAY" key, and display 147 will appear. If the operator then pushes the "SELECT" key, then the display 148 will appear. If the operator wants to have the control, during the cycle, automatically scroll through the provided parameters and conditions, then the operator will press the FUNCTION "ON" key, and thereafter the displays 149–156 will automatically appear in sequence at timed intervals of rather short duration.

Steps 149–156

The display 149 initially appears and will display the incoming air pressure $P_s$, namely the line pressure; the display 151 will provide the air pressure $P_a$ at the feed pump; the display 152 will display the slurry pressure $P_w$; the display 153 displays the hydraulic pressure which is holding the press in the closed position; the display 154 displays the "cycle time" in hours, with the left side FIGURE being the cycle time which has elapsed from the beginning of the cycle in process, and the right side time being the total time required to complete the prior cycle; the display 155 displays total hours that the press has been running since initial set up; and the display 156 displays the average number of cycles (for example 3.3) during the last 24 hour period prior to initiation of the current cycle in process. The microprocessor controller automatically recomputes this average each time a cycle is completed. The information in display 156 provides the operator with visual indication as to how many cycles can be completed within 24 hours and provides an arcuate number based on the last 24-hour interval, and the display 154 provides the operator with an indication as to how much longer the current cycle will take to complete since it provides not only the elapsed time of the cycle in process, but also the total time required to complete the prior cycle. The displays 149–156 will sequentially appear, and then repeat, so long as the press is filling, prior to shut down.

If the operator at display 148 elects to press the FUNCTION "OFF" and thereafter presses the FUNCTION "SELECT" key, the displays 149–156 can then be manually scrolled.

Steps 159–162

When the filter press is full, the control cycle will end and the display 157 will automatically appear, and the membrane squeeze will automatically occur until it times out. Thereafter display 158 will automatically appear and time out during the air blowing step, followed by appearance of the display 159 which will time out during the core blow step. This then results in the display 161 which indicates that the cycle is complete. At this time the control then waits for the operator to formally end the cycle by pressing the cycle "OFF" key.

Thereafter additional instructional prompts and controls will appear in the display window 73, such as for controlling release of hydraulic pressure and press opening, although description of these latter functions is believed unnecessary.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for controlling slurry pressure in a filter press in which a slurry material is supplied under pressure to a plurality of filter plates by a feed pump which is activated by a fluid having a defined pump pressure, comprising the steps of:

providing a pressure sensor for detecting slurry pressure;

actuating the feed pump for operation at a selected initial said pump pressure to feed the slurry into the press;

thereafter, repeatedly executing a first sequence of steps until the slurry pressure reaches an upper pressure limit, said first sequence of steps being defined by (1) determining the slurry pressure from the pressure sensor, (2) subtracting the slurry pressure from the pump pressure to obtain an actual pump lead pressure, (3) determining whether the actual pump lead pressure is less than a desired pump lead pressure, and (4) increasing the pump pressure if the actual pump lead pressure is less than the desired pump lead pressure;

thereafter, executing a second sequence of steps defined by (1) determining that the slurry pressure has reached the upper pressure limit, (2) recording a trigger point in time at which the slurry pressure reached the upper pressure limit, and (3) determining whether the slurry pressure subsequently falls below a lower pressure limit within a predetermined period of time commencing at said trigger point; and thereafter, and only if the slurry pressure falls below the lower pressure limit within said predetermined period of time, repeating said second sequence of steps until the slurry pressure fails to fall below the lower pressure limit within said predetermined period of time; and shutting down the feed of slurry into the press only if the slurry pressure fails to fall below the lower pressure limit within said predetermined period of time and said predetermined period of time elapses.

2. A method according to claim 1, including the step of maintaining the pump pressure at an upper pressure corresponding to the upper pressure limit even if the slurry pressure falls below the upper pressure limit.

3. A method according to claim 1, including the step of maintaining the pump pressure substantially constant when a decrease in slurry pressure is detected, and again increasing the pump pressure only when the actual pump lead pressure is less than the desired pump lead pressure.

4. A method according to claim 1, including the steps of:

sensing the pressure of a main supply source which supplies pressurized air to the pump;

initially setting the upper pressure limit at a value which is slightly below the source pressure;

sensing the source pressure and comparing it to the upper pressure limit to determine if the source pressure exceeds the upper pressure limit by a small predetermined pressure deferential;

thereafter adjusting the upper pressure limit to reduce the value thereof to cause the adjusted upper pressure limit to be smaller than the source pressure by said predetermined pressure differential; and thereafter repeating this latter sequence of steps.

5. A method for controlling slurry pressure in a filter press in which a slurry material is supplied under pressure to a plurality of filter plates by a feed pump which is activated by a fluid having a defined pump pressure, comprising the steps of:

actuating the feed pump for operation at a selected initial said pump pressure to feed the slurry into the filter press;

thereafter, gradually increasing the pump pressure until the slurry pressure reaches an upper pressure limit;

thereafter, executing a sequence of steps defined by (1) determining that the slurry pressure has reached the upper pressure limit, (2) recording a trigger point in time at which the slurry pressure reached the upper pressure limit, and (3) determining whether the slurry pressure subsequently falls below a lower pressure limit within a predetermined period of time commencing at said trigger point; and thereafter, and only if the slurry pressure falls below the lower pressure limit within said predetermined period of time, repeating said sequence of steps until the slurry pressure fails to fall below the lower pressure limit within said predetermined period of time; and shutting down the feed of slurry into the press only if the slurry pressure fails to fall below the lower pressure limit within said predetermined period of time and said predetermined period of time elapses.

6. A method according to claim 5, wherein said step of gradually increasing the pump pressure includes the steps of detecting the slurry pressure, and increasing the pump pressure when the detected slurry pressure reaches a predetermined pressure range below the pump pressure.

7. A method according to claim 6, including the step of maintaining the pump pressure substantially constant at an upper pressure corresponding to the upper pressure limit even if the slurry pressure falls below the upper pressure limit.

8. A method according to claim 6, including the step of maintaining the pump pressure substantially constant when a decrease in slurry pressure is detected, and again increasing the pump pressure only when the actual pump lead pressure is less than the desired pump lead pressure.

9. A method according to claim 8, including the steps of:

sensing the pressure of a main supply source which supplies pressurized air to the pump;

initially setting the upper pressure limit at a value which is slightly below the source pressure;

sensing the source pressure and comparing it to the upper pressure limit to determine if the source pressure exceeds the upper pressure limit by a small predetermined pressure deferential;

thereafter adjusting the upper pressure limit to reduce the value thereof to cause the adjusted upper pressure limit to be smaller than the source pressure by said predetermined pressure differential; and thereafter repeating this latter sequence of steps.

10. A method for controlling slurry pressure in a filter press which receives therein and filters pressurized slurry material, comprising the steps of:

executing a sequence of steps defined by (1) increasing the slurry pressure until the slurry pressure reaches an upper pressure limit, (2) recording a trigger point in time at which the slurry pressure reaches the upper pressure limit, and (3) determining whether the slurry pressure subsequently falls below a lower pressure limit within a predetermined period of time commencing at said trigger point; and thereafter, and only if the slurry pressure falls below the lower pressure limit within said predetermined period of time, repeating said sequence of steps until the slurry pressure fails to fall below the lower pressure limit within said predetermined period of time.

11. A method according to claim 10, including the step of maintaining a pressure of a pump which pressurizes the material at an upper pressure corresponding to said upper pressure limit even if the slurry pressure falls below said upper pressure limit.

12. A process for controlling a filter press having multiple diaphragm-type plates, a feed pump for pressurizing and supplying slurry into the filter press, and a control unit for controlling operation of the filter press, comprising the steps of:

providing said press with a programmable control including a control panel having operating keys associated therewith and a visual display for displaying operational prompts and parameters;

manually inputting into said control via the keys operational parameters including (1) an upper pressure limit corresponding to a maximum slurry pressure at which a press filling cycle will end, and (2) a time interval which determines a minimum length of time which the pump will continue to operate following sensing of the upper pressure limit;

supplying pressurized air to the feed pump for actuating the feed pump to supply slurry into the press;

substantially continuously sensing the slurry pressure discharged from the pump and adjusting the air pressure supply to the pump so that the air pressure to the pump is increased whenever the slurry pressure increases so as to maintain the air pressure above the slurry pressure by a substantially uniform pressure difference;

periodically and sequentially displaying, in the display on the control panel, throughout the filling cycle the pump air pressure and the slurry pressure;

recording the elapsed time during the filling cycle in progress;

recording the length of time required to complete the previous filling cycle;

periodically displaying the elapsed cycle time and the prior cycle completion time in the display during the press filling cycle in progress;

computing and recording the number of complete filling cycles of the press during the 24 hour time interval which occurred prior to initiation of the filling cycle currently in process;

periodically displaying the number of completed cycles during the prior 24 hour interval in the display of the control panel during the press filling cycle in process; and shutting down the feed pump and terminating the filling cycle when the slurry pressure does not fall below a predetermined lower pressure limit and the predetermined time interval thereafter times out.

13. A method according to claim 12, including the steps of:

providing an air pressure source which maintains a relatively uniform line pressure which is generally greater than the air pressure supplied to the pump;

supplying the line pressure to the pump through a pressure controller for reducing the line pressure to the desired pump air pressure;

continuously monitoring the line pressure upstream of the pressure controller; and periodically displaying said line pressure in the display on the control panel during the press filling cycle in process.

14. A process for controlling a filter press having multiple diaphragm-type plates, a feed pump for pressurizing and supplying slurry into the filter press, and a control unit for controlling operation of the filter press, comprising the steps of:

providing said press with a programmable control including a control panel having operating keys associated therewith and a visual display for displaying operational prompts and parameters;

manually inputting into said control via the keys operational parameters including (1) an upper pressure limit corresponding to a maximum slurry pressure at which the press fill cycle will end, and (2) a time interval which determines a minimum length of time which the pump will continue to operate following sensing of the upper pressure limit;

providing an air pressure source which maintains a relatively uniform line pressure which is typically greater than the air pressure supplied to the pump;

supplying pressurized air to the feed pump for actuating the feed pump to supply slurry into the press;

supplying the line pressure to the pump through a pressure controller for reducing the line pressure to a desired pump air pressure;

continuously monitoring the line pressure;

periodically displaying said line pressure upstream of the pressure controller in the display on the control panel during the press filling cycle in process;

comparing the line pressure with said upper pressure limit;

reducing the value of said upper pressure limit when the upper pressure limit is less than a predetermined pressure difference smaller than said line pressure;

thereafter repeating the latter two steps;

substantially continuously sensing the slurry pressure discharged from the pump and adjusting the air pressure supply to the pump so that the air pressure to the pump is increased whenever slurry pressure increases so as to maintain the air pressure above the slurry pressure by a fairly uniform pressure difference;

periodically and sequentially displaying, in the display on the control panel, throughout a filling cycle the pump air pressure and the slurry pressure; and shutting down the feed pump and terminating the filling cycle when the slurry pressure equals the upper pressure limit and the predetermined time interval thereafter times out.

15. A process for controlling a filter press having multiple diaphragm-type plates, a feed pump for pressurizing and supplying slurry into the filter press, and a control unit for controlling operation of the filter press, comprising the steps of:

providing said press with a programmable control including a control panel having operating keys associated therewith and a visual display for displaying operational prompts and parameters;

manually inputting into said control via the keys operational parameters including (1) an upper pressure limit corresponding to a maximum slurry pressure at which the press fill cycle will end, and (2) a time interval which determines a minimum length of time which the pump will continue to operate following sensing of the upper pressure limit;

supplying pressurized air to the feed pump for actuating the feed pump to supply slurry into the press;

substantially continuously sensing the slurry pressure discharged from the pump and adjusting the air pressure supply to the pump so that the air pressure to the pump is increased whenever slurry pressure increases so as to maintain the air pressure above the slurry pressure by a fairly uniform pressure difference;

sensing when the slurry pressure decreases;

maintaining the pump air pressure substantially constant when the slurry pressure decreases;

resuming increasing the pump air pressure only when the slurry pressure is again within the predetermined pressure difference of said pump air pressure;

periodically and sequentially displaying, in the display on the control panel, throughout the filling cycle the pump air pressure and the slurry pressure; and shutting down the feed pump and terminating a filling cycle when the slurry pressure equals the upper pressure limit and the predetermined time interval thereafter times out.

16. A method according to claim 15, including the steps of:

providing a lower pressure limit which is only a small predetermined pressure difference below said upper pressure limit;

activating a timer preset with said predetermined time interval when the slurry pressure reaches said upper pressure limit;

deactivating said timer if the slurry pressure falls down to or below the lower pressure limit prior to said time interval timing out;

then continuing the feed of slurry to the press until said timer is again activated; and terminating feed of slurry to said press only if said timer times out prior to the slurry pressure falling down to said lower pressure limit.

* * * * *